US011128626B2

(12) United States Patent
Stecher et al.

(10) Patent No.: US 11,128,626 B2
(45) Date of Patent: *Sep. 21, 2021

(54) SECURITY SERVICE FOR AN UNMANAGED DEVICE

(71) Applicant: McAfee, LLC, San Jose, CA (US)

(72) Inventors: Martin Stecher, Paderborn (DE); Andre Sabban, Paderborn (DE)

(73) Assignee: McAfee, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/725,113

(22) Filed: Dec. 23, 2019

(65) Prior Publication Data

US 2020/0137060 A1 Apr. 30, 2020

Related U.S. Application Data

(63) Continuation of application No. 14/866,800, filed on Sep. 25, 2015, now Pat. No. 10,554,662.

(60) Provisional application No. 62/186,896, filed on Jun. 30, 2015.

(51) Int. Cl.
| | |
|---|---|
| *H04L 29/06* | (2006.01) |
| *H04L 12/26* | (2006.01) |
| *H04W 12/37* | (2021.01) |
| *G06F 8/65* | (2018.01) |
| *H04L 29/08* | (2006.01) |

(52) U.S. Cl.
CPC .............. *H04L 63/10* (2013.01); *H04L 43/50* (2013.01); *H04L 63/102* (2013.01); *H04W 12/37* (2021.01); *G06F 8/65* (2013.01); *H04L 63/0281* (2013.01); *H04L 67/02* (2013.01)

(58) Field of Classification Search
CPC . H04L 63/10; H04L 63/0884; H04L 63/1441; H04L 67/2814; H04L 2463/144; H04L 63/0281; H04L 63/20; H04L 63/101; H04L 63/08; G06F 21/00; G06F 21/44; H04W 12/08; H04W 12/37
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 6,606,708 B1 * | 8/2003 | Devine | G06F 11/0709 726/8 |
| 7,451,217 B2 * | 11/2008 | Wardrop | G06F 21/335 709/225 |

(Continued)

FOREIGN PATENT DOCUMENTS

| | | |
|---|---|---|
| CN | 1910850 A | 2/2007 |
| CN | 102368728 A | 3/2012 |
| EP | 2403210 A1 | 1/2012 |

*Primary Examiner* — Farid Homayounmehr
*Assistant Examiner* — Lizbeth Torres-Diaz
(74) *Attorney, Agent, or Firm* — Patent Capital Group

(57) ABSTRACT

Particular embodiments described herein provide for a network element that can be configured to receive, from an electronic device, a request to access a network service. In response to the request, the network element can send data related to the network service to the electronic device and add a test link to the data related to the network service. The network element can also be configured to determine if the test link was successfully executed and classify the electronic device as untrusted if the test link was not successfully executed.

20 Claims, 8 Drawing Sheets

(56) References Cited

U.S. PATENT DOCUMENTS

| | | | |
|---|---|---|---|
| 7,506,155 B1 | 3/2009 | Stewart et al. | |
| 7,752,202 B2* | 7/2010 | Kobori | H04L 67/2823 |
| | | | 707/736 |
| 8,458,296 B2* | 6/2013 | Lamouline | H04L 61/301 |
| | | | 709/219 |
| 8,966,446 B1* | 2/2015 | Amacker | H04L 67/42 |
| | | | 717/124 |
| 8,997,222 B2* | 3/2015 | Meliksetian | H04L 67/02 |
| | | | 726/22 |
| 9,473,530 B2* | 10/2016 | Bhogavilli | H04L 63/10 |
| 10,084,780 B2* | 9/2018 | Bao | H04L 63/0435 |
| 2006/0135066 A1 | 6/2006 | Banerjea | |
| 2007/0088834 A1* | 4/2007 | Litovski | H04L 69/24 |
| | | | 709/227 |
| 2008/0307221 A1* | 12/2008 | Horita | H04L 9/3265 |
| | | | 713/156 |
| 2010/0242092 A1* | 9/2010 | Harris | G06F 21/53 |
| | | | 726/3 |
| 2012/0151568 A1* | 6/2012 | Pieczul | H04L 67/02 |
| | | | 726/8 |
| 2013/0003558 A1 | 1/2013 | Kahkoska | |
| 2013/0346472 A1* | 12/2013 | Wheeldon | H04L 67/02 |
| | | | 709/203 |
| 2014/0007214 A1 | 1/2014 | Qureshi et al. | |
| 2014/0020072 A1* | 1/2014 | Thomas | H04L 63/102 |
| | | | 726/7 |
| 2014/0096194 A1* | 4/2014 | Bhogavilli | H04L 63/0281 |
| | | | 726/3 |
| 2014/0108672 A1* | 4/2014 | Ou | H04L 45/22 |
| | | | 709/238 |
| 2014/0282869 A1* | 9/2014 | Dabbiere | G06F 21/44 |
| | | | 726/3 |
| 2014/0337528 A1 | 11/2014 | Barton et al. | |
| 2015/0207814 A1* | 7/2015 | Prince | G06F 21/00 |
| | | | 726/23 |
| 2017/0006033 A1 | 1/2017 | Stecher et al. | |
| 2017/0031968 A1* | 2/2017 | Balasubramanian | G06F 16/9566 |

* cited by examiner

132

```
<! -- Start Reverse Proxy Marker for MWG -->
<img src="https://random_url/parameters" height=1 width=1 />
<! -- End Reverse Proxy Marker for MWG -->
```
134

SECURITY SERVICE FOR AN UNMANAGED DEVICE

CROSS-REFERENCE TO RELATED APPLICATION

This application is a continuation of U.S. application Ser. No. 14/866,600 filed Sep. 25, 2015, entitled "SECURITY SERVICE FOR AN UNMANAGED DEVICE," which claims the benefit of priority under 35 U.S.C. § 119(e) to U.S. Provisional Application No. 62/186,896, entitled "SECURITY SERVICE FOR AN UNMANAGED DEVICE" filed in the U.S. Patent Office on Jun. 30, 2015, which are hereby incorporated by reference in their entirety.

TECHNICAL FIELD

This disclosure relates in general to the field of information security, and more particularly, to a security service for an unmanaged device.

BACKGROUND

The field of network and cloud security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. Hence, significant administrative challenges remain for protecting computers and computer networks from malicious and inadvertent exploitation by malicious software and devices. In addition, the Internet currently includes a fast growing number of managed and primarily unmanaged devices and users working with information across multiple devices and with many applications (of which more and more also cloud-based). As a result, data protection of sensitive information becomes an important mission of computer security and the more enforcement points a security policy can manage, the better the capabilities to secure data.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1:
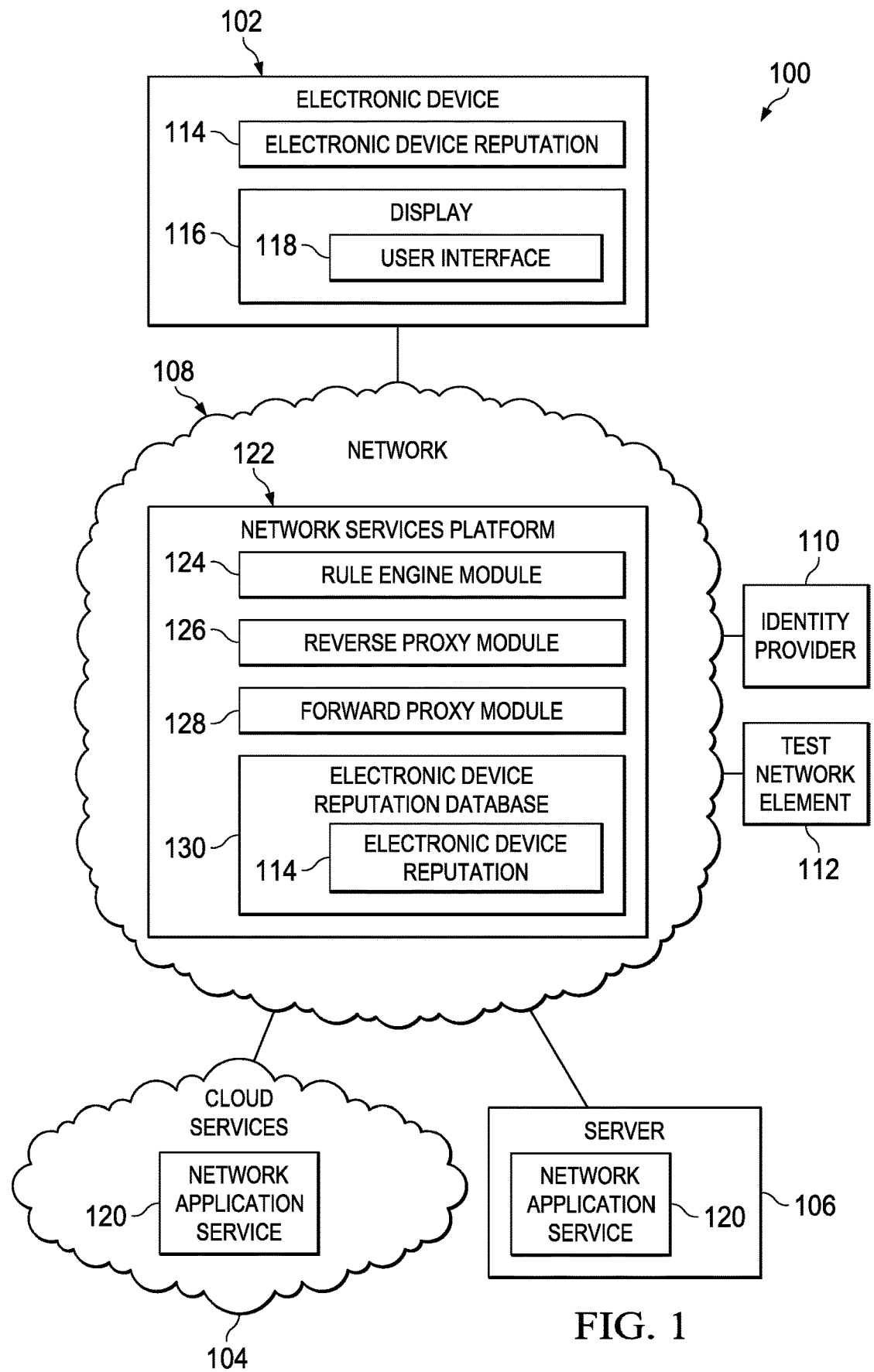
FIG. 1 is a simplified block diagram of a communication system for a security service for an unmanaged device, in accordance with an embodiment of the present disclosure.

FIG. 1 is a simplified block diagram of a communication system 100 for a security service for an unmanaged device, in accordance with an embodiment of the present disclosure. As illustrated in FIG. 1, communication system 100 can include electronic device 102, cloud services 104, a server 106, a network 108, an identify provider 110, and a test network element 112. Electronic device 102 can include an electronic device reputation 114 and a display 116. Display 116 can include a user interface 118. Cloud services 104 and server 106 can each include one or more network application services 120. Each network application service 120 can be a service a user of electronic device 102 commonly accesses or uses. For example, using electronic device 102, a user may access or use network application service 120 on a daily basis or several times a day. Electronic device 102, cloud services 104, server 106, identify provider 110, and test network element 112 may be in communication using network 108. Network 108 can include a network services platform 122. Network services platform 122 can include a rule engine module 124, a reverse proxy module 126, a forward proxy module 128, and an electronic device reputation database 130. Electronic device reputation database 130 can include electronic device reputation 114.

Elements of FIG. 1 may be coupled to one another through one or more interfaces employing any suitable connections (wired or wireless), which provide viable pathways for network (e.g., network 108, etc.) communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

For purposes of illustrating certain example techniques of communication system 100, it is important to understand the communications that may be traversing the network environment. The following foundational information may be viewed as a basis from which the present disclosure may be properly explained.

Currently, unmanaged devices and the ability to provide security services to those devices is a challenge. Previously, the devices were linked by a single network and it was easy to control the routing and data on that network and the routing and data communicated to and from the device. Today, some devices are connected to cloud services and other networks (e.g., the Internet) which makes it difficult to control the routing and data that is communicated to and from the device. For example, in a corporate environment, some users use their own devices to access at least a portion of the corporate network and it can be difficult for an business end administrator to provide security services to the device because the user is the owner and administrator of the device. Some solutions try to enforce the routing of the traffic on a technology level (e.g., VPN, DNS, APN, agent, etc.) but run into issues because the unmanaged device (e.g., a bring your own device (BYOD)) by definition, means the business administrator has no control over the unmanaged device itself. The network connections are not well-controllable either as the user has the ability to log into a variety of networks (e.g., cellular providers, private Wi-Fis, etc.). What is needed is a way to provide security services to the unmanaged device. It would be beneficial if a cloud application could be controlled in the network and then test the unmanaged device's behavior and coach and negotiate desired settings on the unmanaged device.

In an example, communication system 100 can test for desired behavior that is, test to determine whether the user has configured the electronic device (e.g., electronic device 102) to route all internet traffic though a security product such as network services platform 122. If not, communication system 100 can be configured to redirect the user of the electronic device to conform to desired behavior (e.g., display instructions on display 116 as to how to configure electronic device 102). The system can use reverse proxy (e.g., through reverse proxy module 126) to a known desired service that the user is likely to use (e.g., network application service 120) and a hidden image linking to a "pseudo-random" web server, well-known server, or some other predefined network element (e.g., test network element 112) in order to test whether the electronic device conforms to a desired configuration. If the electronic device does not conform to the desired configuration, a message can be used to coach or instruct a user as to how to make the electronic device compliant. If the user does not make the electronic device compliant, then access the desired service can become disabled. In an example, a device can be considered complaint if network traffic from the device go through network services platform 122. By forcing network traffic to go through network services platform, rule engine module 124 can enforce rules or policies regarding the network traffic and data in the network traffic. For example, rule engine module 124 may not allow any documents marked confidential to be sent from electronic device 102 or data (e.g., photographs or videos) to be sent from a secure location.

In an example, communication system 100 can test for desired behavior that is, test to determine whether the user has configured the electronic device (e.g., electronic device 102) to route all internet traffic though a security product such as network services platform 122. If not, communication system 100 can be configured to redirect the user of the electronic device to conform to desired behavior (e.g., display instructions on display 116 as to how to configure electronic device 102). The system can use reverse proxy (e.g., through reverse proxy module 126) to a known desired service that the user is likely to use (e.g., network application service 120) and a hidden image linking to a "pseudo-random" web server, well-known server, or some other predefined network element (e.g., test network element 112) in order to test whether the electronic device conforms to a desired configuration. If the electronic device does not conform to the desired configuration, a message can be used to coach or instruct a user as to how to make the electronic device compliant. If the user does not make the electronic device compliant, then access the desired service can become disabled. In an example, a device can be considered complaint if network traffic from the device go through network services platform 122. By forcing network traffic to go through network services platform, rule engine module 124 can enforce rules or policies regarding the network traffic and data in the network traffic. For example, rule engine module 124 may not allow any documents marked confidential to be sent from electronic device 102 or data (e.g., photographs or videos) to be sent from a secure location.

In an example, at least a portion of traffic from the electronic device is diverted from an unmanaged device in a user-friendly way. More specifically, at least a portion of the traffic from the electronic device can be routed through a network element (e.g., network services platform 122) that is configured to apply security policies to the traffic from the electronic device. In one implementation, a reverse proxy for a desired application can be used. The desired application can be an application that is a cloud-based application that an administrator of the system owns or licenses, is hosted by a third party, and is often visited by user (e.g., Office365®, etc.). If the device is not currently configured as desired, the system can direct the user to configure the electronic device as desired. For example, a instructions can be displayed on display 116 on how to use user interface 118 to configure the device as desired by an administrator.

Communication system 100 can be configured to allow a business administrator to communicate the credentials to sign-in or register with the network application service using identity provider 110 (e.g., an ID broker/federation service). This creates a system where there is not a convenient bypass for a user to login into the desired application (e.g., network application service 120). In addition, reverse proxy module 126 can be located in front of the electronic device and can access identity provider 110 to help prevent bypass of the system by the user.

To analyze internet traffic to the electronic device and ensure the device is configured as desired and security policies can be enforced, communication system 100 can be configured to test and determine if the electronic device has been configured for traffic to go through network services platform 122. To enable the testing, communication system 100 can be configured to use the data that is being communicated to the electronic device from network service application 120. The data can be changed or amended to inject code (e.g., a link or URL) or a test link into the data or pages being delivered to the electronic device. The change or amendment to the data may be an instruction to load an image from a specific URL (e.g., a URL that points to test network element 112). The injected data or test link is not important and it does not matter which server or network element is involved as the system is only determining if the new server request is also routed thru network services platform 122 due to settings on the electronic device made by a compliant user or whether the request is bypassing network services platform 122 due to the settings on the electronic device made by an non-compliant user.

In an example, if network services platform 122 sees the request for the previously injected URL, the electronic device is marked compliant or trusted and the request is answered directly by network services platform 122 with a positive HTTP response that does not change the user experience of the desired service (e.g., by providing a transparent image) or the test link is not readily identifiable by a user of the electronic device. If network services platform 122 does not receive the test URL and the test times out, the electronic device is marked as non-compliant or untrusted and the request is sent directly to a remote test server or test network element that may or may not exist so that the typical response will be an HTTP error message. The embedded object on the desired application's page can be shown broken or may not even be displayed on display 116.

In another example, communication system 100 can be configured to record the URL that was embedded in the web page requested from the electronic device. If network services platform 122 did not see traffic from the URL come through network services platform 122, network services platform 122 can be configured to determine that the electronic device has not been configured as desired. In addition, if the system does not see the traffic from the web browser at network services platform 122, a not compliant or untrusted classification can be assigned to the electronic device in electronic device reputation database 130. In another example, the classification can be recorded in a cookie or in some other means that can be used to classify the electronic device as non-compliant or untrusted. If network services platform 122 does see the traffic, the electronic device can be marked as compliant or trusted. If a device is marked as not compliant or untrusted, network services platform 122 can wait for the next request to network application service 120 and network services platform 122 can apply a redirection asking the user to reconfigure electronic device and threaten to take away access to network application service 120 if the device is not made compliant.

Turning to the infrastructure of FIG. 1, communication system 100 in accordance with an example embodiment is shown. Generally, communication system 100 can be implemented in any type or topology of networks. Network 108 represents a series of points or nodes of interconnected communication paths for receiving and transmitting packets of information that propagate through communication system 100. Network 108 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic device 102, cloud services 104, server 106, identity provider 110, test network element 112, and network services platform 122 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 100, each of electronic device 102, cloud services 104, server 106, identity provider 110, test network element 112, and network services platform 122 can include memory elements for storing information to be used in the operations outlined herein. Each of electronic device 102, cloud services 104, server 106, identity provider 110, test network element 112, and network services platform 122 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 100, such as electronic device 102, cloud services 104, server 106, identity provider 110, test network element 112, and network services platform 122 may include software modules (e.g., rules engine module 124, reverse proxy module 126, and forward proxy module 128) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic device 102, cloud services 104, server 106, identity provider 110, test network element 112, and network services platform 122 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic device 102 can be a network element and includes, for example, desktop computers, laptop computers, mobile devices, personal digital assistants, smartphones, tablets, or other similar devices. Cloud services 104 is configured to provide cloud services to electronic device 102. Cloud services 104 may generally be defined as the use of computing resources that are delivered as a service over a network, such as the Internet. Typically, compute, storage, and network resources are offered in a cloud infrastructure, effectively shifting the workload from a local network to the cloud network. Server 106 can be a network element such as a server or virtual server and can be associated with clients, customers, endpoints, or end users wishing to initiate a communication in communication system 100 via some network (e.g., network 108). The term 'server' is inclusive of devices used to serve the requests of clients and/or perform some computational task on behalf of clients within communication system 100. Although network services platform 122 is represented in FIG. 1 as being located in network 108, this is for illustrative purposes only. Network services platform 122 could be combined or separated in any suitable configuration.

Figure 2:
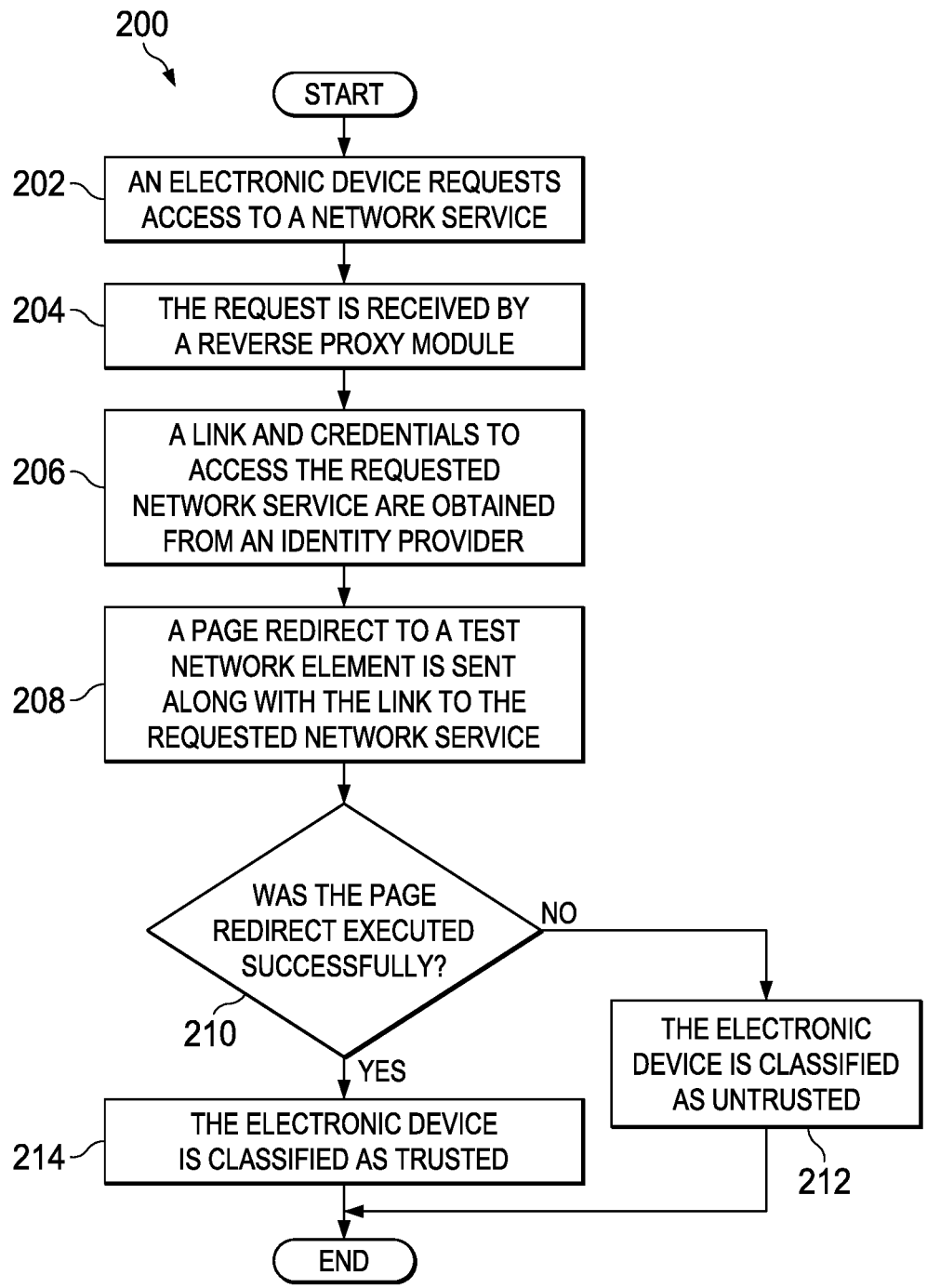
FIG. 2 is a simplified flowchart illustrating potential operations that may be associated with the communication system in accordance with an embodiment.

Turning to FIG. 2, FIG. 2 is an example flowchart illustrating possible operations of a flow 200 that may be associated with a security service for an unmanaged device, in accordance with an embodiment. In an embodiment, one or more operations of flow 200 may be performed by network services platform 122. At 202, an electronic device requests access to a network service. At 204, the request is received by a reverse proxy module. At 206, a link and credentials to access the requested network service are obtained from an identity provider. In an example, the identity is federated to the network service while forwarding the request from the reverse proxy to the service. The response page from the network service can be received by the proxy. At 208, a page redirect (or test link) to a test network element is sent along with the link to the requested network service. At 210, the system determines if the page redirect was executed successfully. If the page redirect was not executed successfully, then the electronic device is classified as untrusted, as in 212. If the page redirect was executed successfully, then the electronic device is classified as trusted, as in 214.

For example, an embedded link (e.g. link 132, shown in FIG. 7) can be inserted into data sent to electronic device 102 when electronic device requests data from network application service 120. The embedded link can be a page redirect and if the page redirect was executed successfully, then electronic device 102 is classified as trusted, as in 214. A cookie or some other type of indicator can be stored in electronic device reputation 114 to classify electronic device 102 as trusted and complaint or untrusted and non-compliant. Electronic device reputation 114 can be located only in electronic device 102, only in network services platform 122, in both electronic device 102 and network services platform 122, or some other device or area (e.g., cloud services 104, server 106, etc.) that is accessible by network services platform 122.

Figure 3:
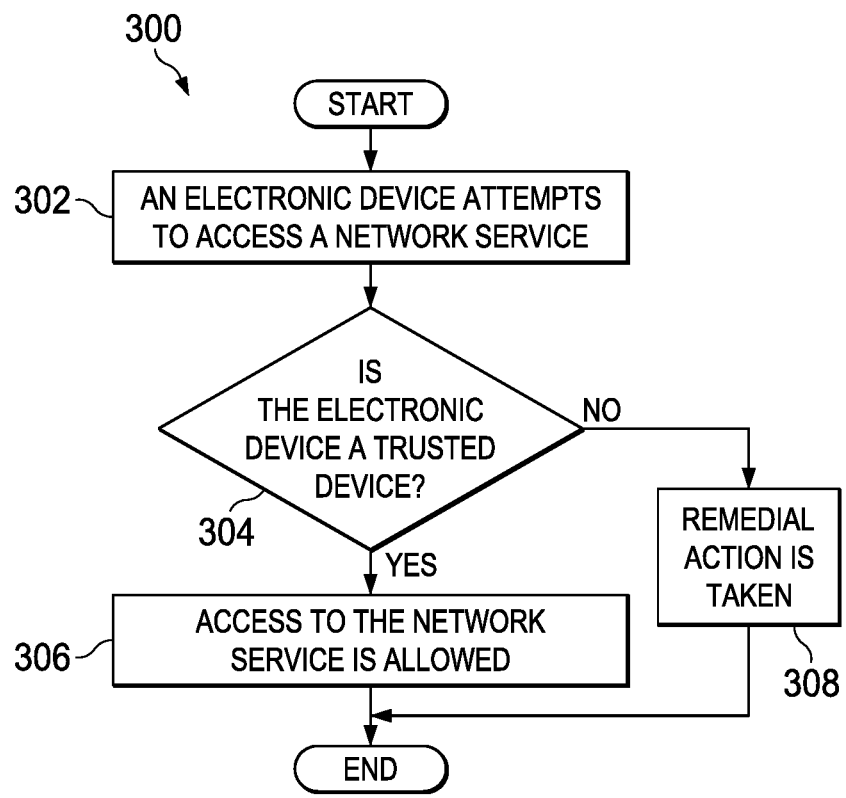
FIG. 3 is a simplified flowchart illustrating potential operations that may be associated with the communication system in accordance with an embodiment.

Turning to FIG. 3, FIG. 3 is an example flowchart illustrating possible operations of a flow 300 that may be associated with a security service for an unmanaged device, in accordance with an embodiment. In an embodiment, one or more operations of flow 300 may be performed by network services platform 122. At 302, an electronic device attempts to access a network service. At 304, the system determines if the electronic device is a trusted electronic device. If the electronic device is a trusted electronic device, then access to the service is allowed, as in 306. If the electronic device is not a trusted electronic device, then remedial action is taken, as in 308. For example the remedial action can be instructions on how to make the electronic device trusted, denying access to the network service, etc.

Figure 4:
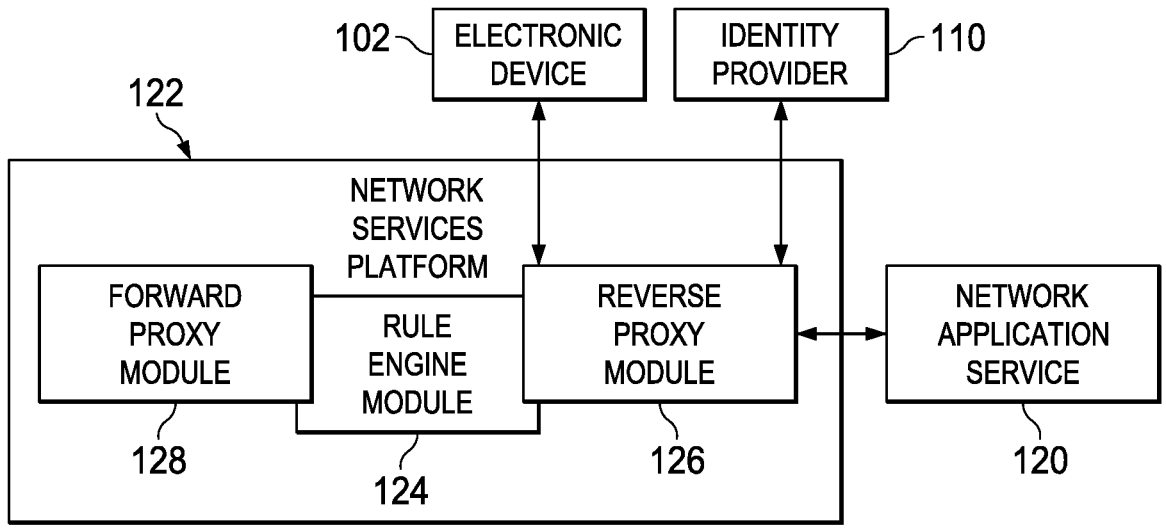
FIG. 4 is a simplified block diagram of a communication system for a security service for an unmanaged device, in accordance with an embodiment of the present disclosure.

Turning to FIG. 4, FIG. 4 is a simplified block diagram of a communication system 100 for a security service for an unmanaged device, in accordance with an embodiment of the present disclosure. As illustrated in FIG. 4, electronic device 102 attempts to connect to network application services 120 through network services platform 122. Reverse proxy module 126 accesses identity provider 110 to obtain the credentials to access network application service 120. The credentials from identity provider 110 can be used by reverse proxy module 126 to allow electronic device 102 to access network application service 120. Without the credentials from identity provider 110, electronic device 102 cannot access network application service 120 and a user is not able to bypass network services platform 122 and access network application service 120. Reverse proxy module 126 is also configured to intercept electronic device's 102 interactions with network application service 120 and insert embedded hidden code to a pseudo-random server in the delivered network content (e.g., web page).

Figure 5:
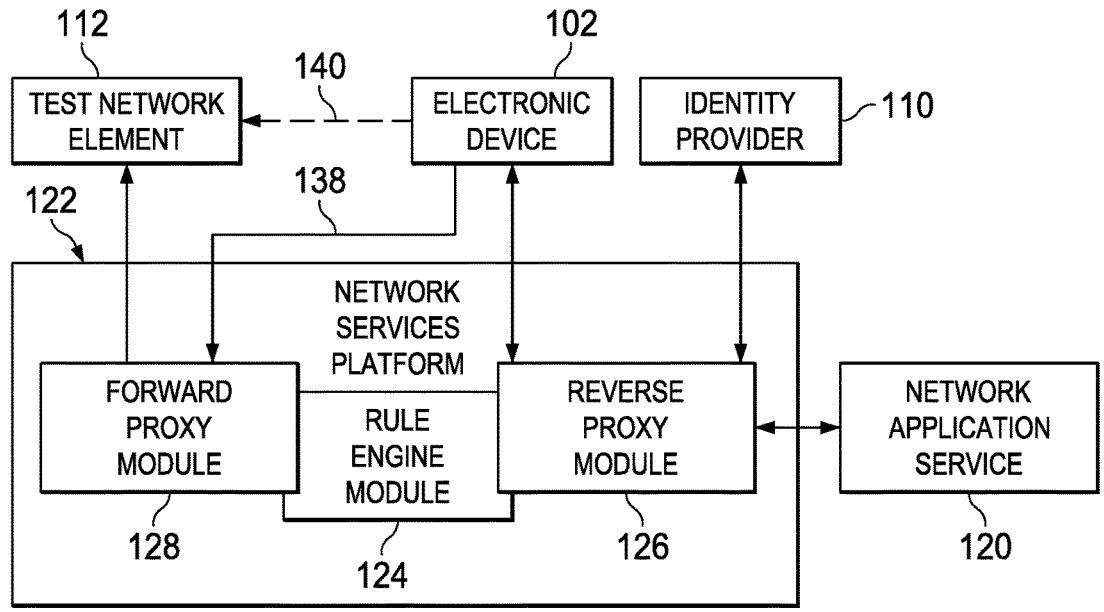
FIG. 5 is a simplified block diagram of a communication system for a security service for an unmanaged device, in accordance with an embodiment of the present disclosure.

Turning to FIG. 5, FIG. 5 is a simplified block diagram of a communication system 100 for a security service for an unmanaged device, in accordance with an embodiment of the present disclosure. To analyze internet traffic to electronic device 102, network services platform 122 can be configured to determine if electronic device 102 has been configured for traffic to go through network services platform 122 to enforce security policies. To enable the testing, network services platform 122 can be configured to use the embedded hidden code that was inserted by reverse proxy module 126 when electronic device 102 accessed network application service 120. The embedded code may be a link to test network element 112. If electronic device 102 is compliant, the link to test network element 112 will go through forward proxy module 128, as shown with path 138. If electronic device 102 is not compliant, the link to test network element 112 will bypass network services platform 122 and use path 140. A user of electronic device 102 may not even be aware that the link was executed.

Figure 6:
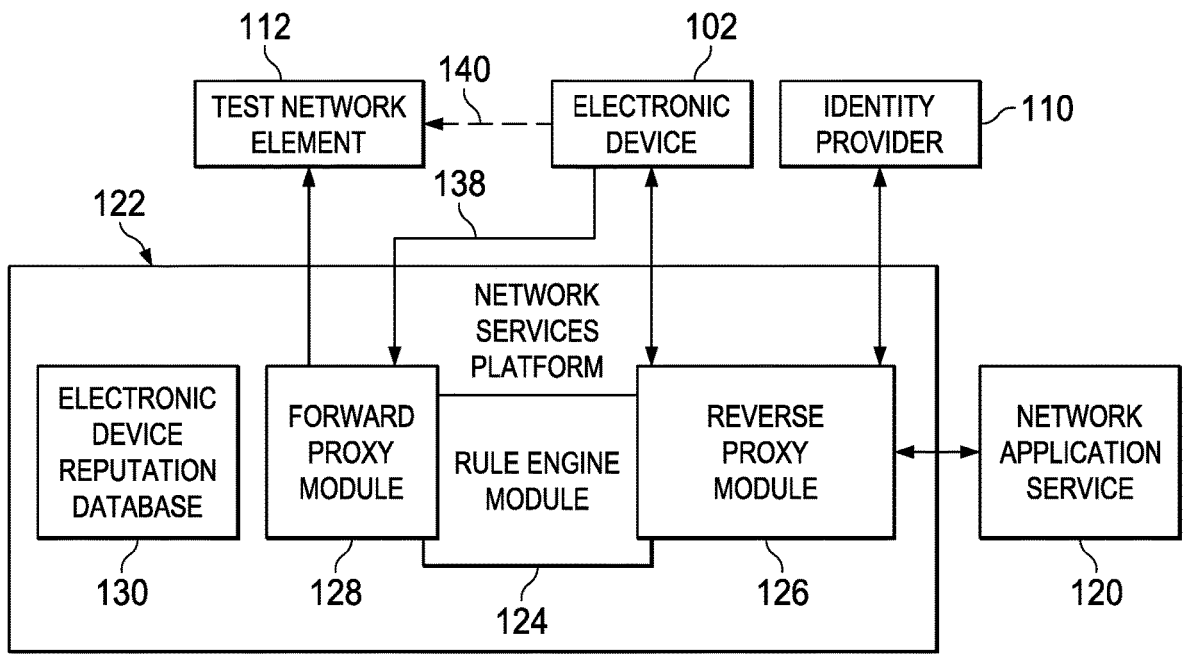
FIG. 6 is a simplified block diagram of a communication system for a security service for an unmanaged device, in accordance with an embodiment of the present disclosure.

Turning to FIG. 6, FIG. 6 is a simplified block diagram of a communication system 100 for a security service for an unmanaged device, in accordance with an embodiment of the present disclosure. If network services platform 122 sees the execution of the hidden code, for example the link to test network element 112, electronic device reputation database 130 can mark electronic device 102 as compliant or trusted. The request may be answered directly by network services platform 122 with a positive HTTP response carrying a transparent image. If network services platform 122 does not receive the link to test network element 112 and the test times out, electronic device reputation database 130 can mark electronic device 102 as non-compliant or untrusted. The classification can be recorded in a cookie or in some other means that can be used to classify the electronic device as non-compliant or untrusted and the classification can be stored in electronic device reputation 114. In one implementation, a trusted cookie or some other means to classify the electronic device as complaint or trusted can be stored in electronic device reputation 114 and if the trusted cookie or other means of classification is not present, then electronic device is deemed to be untrusted.

In an example, if electronic device 102 is non-complaint and network activity does not go through network service platform, the embedded request or link would be sent directly to test network element 112 (e.g., on path 140) and a typical response can be an HTTP error message. The embedded object on the desired application's page can be shown broken or may not even be displayed on display 116. The hidden code, link, URL, etc. that was inserted by reverse proxy module 126 is not important. It does not matter which server or network element is involved as the system is only determining if the request or link to test network element 112 is routed thru network services platform 122 (e.g., on path 138) due to settings on electronic device 102 made by a compliant user or whether the request is bypassing network services platform 122 (e.g., on path 140) due to the settings on electronic device 102 made by an non-compliant user.

Figures 7, 8:
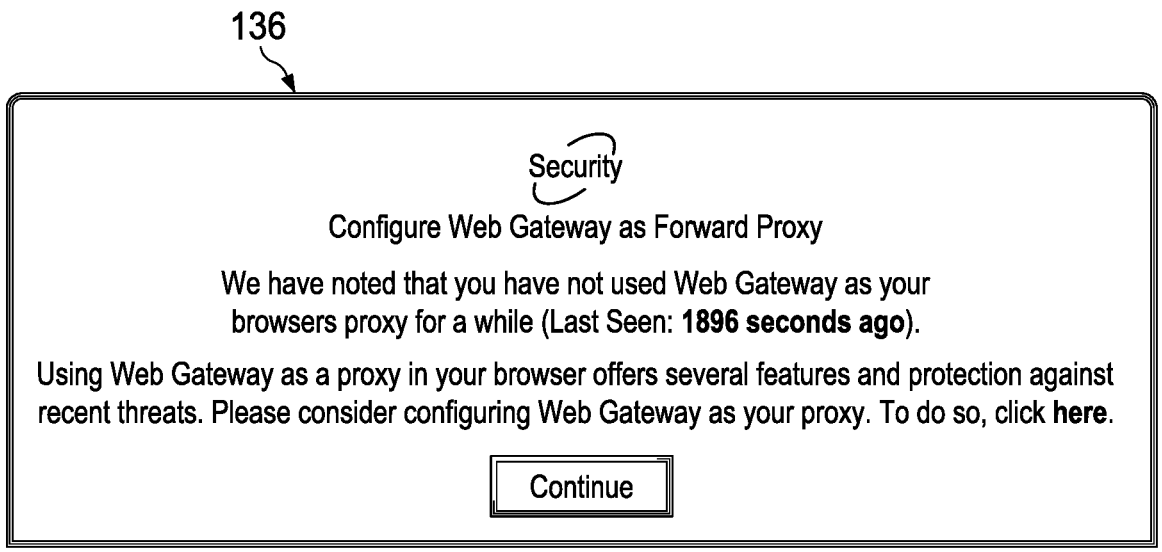
FIG. 7 is a simplified block diagram of a portion of a communication system for a security service for an unmanaged device, in accordance with an embodiment of the present disclosure.
FIG. 8 is a simplified block diagram of a portion of a communication system for a security service for an unmanaged device, in accordance with an embodiment of the present disclosure.

Turning to FIG. 7, FIG. 7 is a simplified example of an embedded or hidden link 132 used in communication system 100 for a security service for an unmanaged device, in accordance with an embodiment of the present disclosure. Link 132 can include a URL 134. URL 134 can be a URL for test network element 112. Link 132 can be imbedded in a page or data related to network application service 120 and be configured as a page redirect.

Turning to FIG. 8, FIG. 8 is a simplified example of a user prompt 136 for use in communication system 100 for a security service for an unmanaged device, in accordance with an embodiment of the present disclosure. User prompt 136 can be a redirection message displayed on display 116 and can be used to coach or instruct a user as to how to make the electronic device compliant when it is determined that electronic device 102 is non-compliant or untrusted. After user prompt 136 is displayed on display 116 and if electronic device 102 is not made compliant and does not conform to the desired configuration, then access network application service 120 can become disabled until electronic device becomes compliant and network traffic is routed through network services platform 122.

Figure 9:
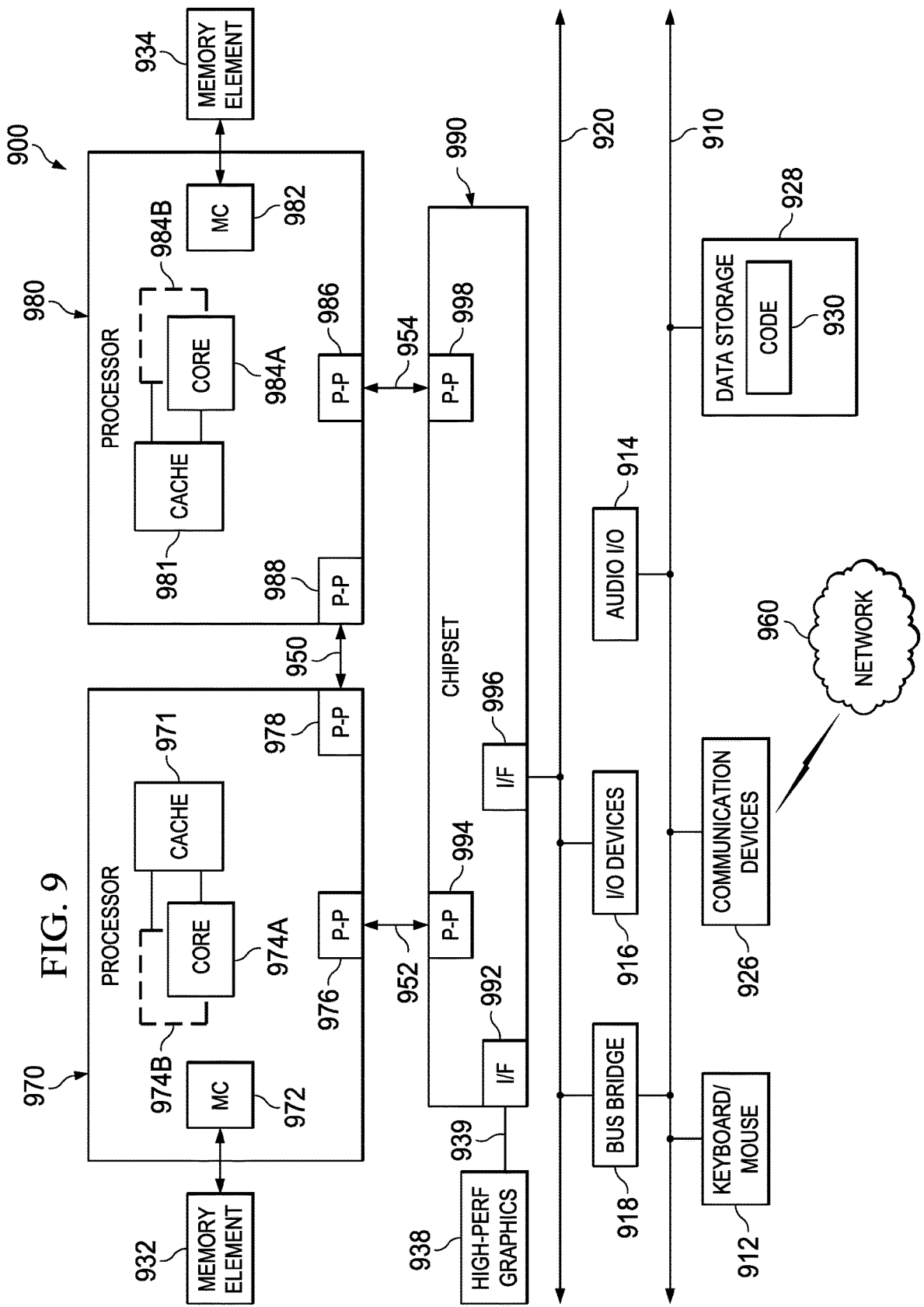
FIG. 9 is a block diagram illustrating an example computing system that is arranged in a point-to-point configuration in accordance with an embodiment.

Turning to FIG. 9, FIG. 9 illustrates a computing system 900 that is arranged in a point-to-point (PtP) configuration according to an embodiment. In particular, FIG. 9 shows a system where processors, memory, and input/output devices are interconnected by a number of point-to-point interfaces. Generally, one or more of the network elements of communication system 100 may be configured in the same or similar manner as computing system 900.

As illustrated in FIG. 9, system 900 may include several processors, of which only two, processors 970 and 980, are shown for clarity. While two processors 970 and 980 are shown, it is to be understood that an embodiment of system 900 may also include only one such processor. Processors 970 and 980 may each include a set of cores (i.e., processor cores 974A and 974B and processor cores 984A and 984B) to execute multiple threads of a program. The cores may be configured to execute instruction code in a manner similar to that discussed above with reference to FIGS. 6-9. Each processor 970, 980 may include at least one shared cache 971, 981. Shared caches 971, 981 may store data (e.g., instructions) that are utilized by one or more components of processors 970, 980, such as processor cores 974 and 984.

Processors 970 and 980 may also each include integrated memory controller logic (MC) 972 and 982 to communicate with memory elements 932 and 934. Memory elements 932 and/or 934 may store various data used by processors 970 and 980. In alternative embodiments, memory controller logic 972 and 982 may be discrete logic separate from processors 970 and 980.

Processors 970 and 980 may be any type of processor and may exchange data via a point-to-point (PtP) interface 950 using point-to-point interface circuits 978 and 988, respectively. Processors 970 and 980 may each exchange data with a chipset 990 via individual point-to-point interfaces 952 and 954 using point-to-point interface circuits 976, 986, 994, and 998. Chipset 990 may also exchange data with a high-performance graphics circuit 938 via a high-performance graphics interface 939, using an interface circuit 992, which could be a PtP interface circuit. In alternative embodiments, any or all of the PtP links illustrated in FIG. 9 could be implemented as a multi-drop bus rather than a PtP link.

Chipset 990 may be in communication with a bus 920 via an interface circuit 996. Bus 920 may have one or more devices that communicate over it, such as a bus bridge 918 and I/O devices 916. Via a bus 910, bus bridge 918 may be in communication with other devices such as a keyboard/mouse 912 (or other input devices such as a touch screen, trackball, etc.), communication devices 926 (such as modems, network interface devices, or other types of communication devices that may communicate through a computer network 960), audio I/O devices 914, and/or a data storage device 928. Data storage device 928 may store code 930, which may be executed by processors 970 and/or 980. In alternative embodiments, any portions of the bus architectures could be implemented with one or more PtP links.

The computer system depicted in FIG. 9 is a schematic illustration of an embodiment of a computing system that may be utilized to implement various embodiments discussed herein. It will be appreciated that various components of the system depicted in FIG. 9 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 10:
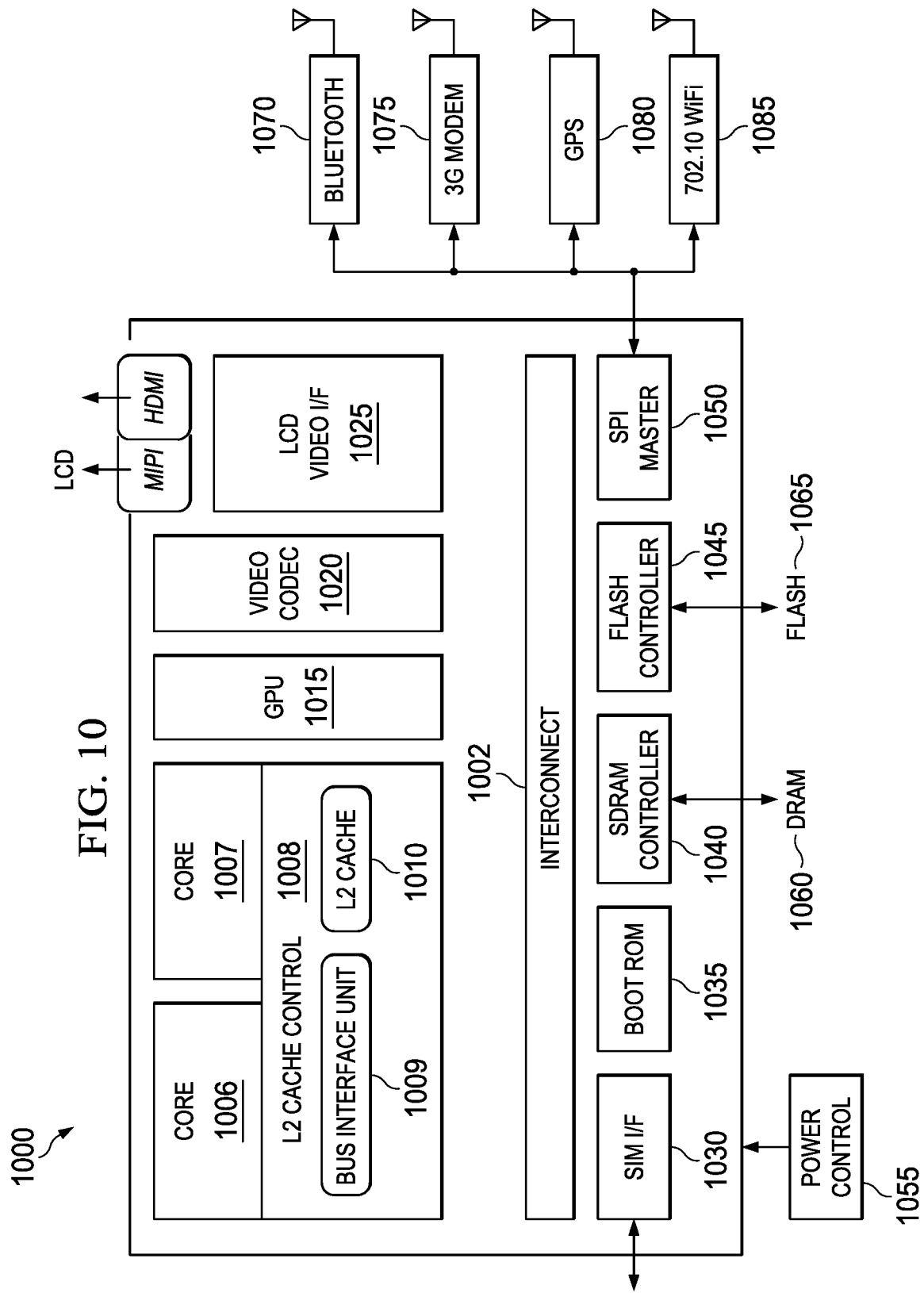
FIG. 10 is a simplified block diagram associated with an example ARM ecosystem system on chip (SOC) of the present disclosure.

Turning to FIG. 10, FIG. 10 is a simplified block diagram associated with an example ARM ecosystem SOC 1000 of the present disclosure. At least one example implementation of the present disclosure can include the security service for an unmanaged device features discussed herein and an ARM component. For example, the example of FIG. 10 can be associated with any ARM core (e.g., A-9, A-15, etc.). Further, the architecture can be part of any type of tablet, smartphone (inclusive of Android™ phones, iPhones™, iPad™ Google Nexus™, Microsoft Surface™, personal computer, server, video processing components, laptop computer (inclusive of any type of notebook), Ultrabook™ system, any type of touch-enabled input device, etc.

In this example of FIG. 10, ARM ecosystem SOC 1000 may include multiple cores 1006-1007, an L2 cache control 1008, a bus interface unit 1009, an L2 cache 1010, a graphics processing unit (GPU) 1015, an interconnect 1002, a video codec 1020, and a liquid crystal display (LCD) I/F 1025, which may be associated with mobile industry processor interface (MIPI)/high-definition multimedia interface (HDMI) links that couple to an LCD.

ARM ecosystem SOC 1000 may also include a subscriber identity module (SIM) I/F 1030, a boot read-only memory (ROM) 1035, a synchronous dynamic random access memory (SDRAM) controller 1040, a flash controller 1045, a serial peripheral interface (SPI) master 1050, a suitable power control 1055, a dynamic RAM (DRAM) 1060, and flash 1065. In addition, one or more example embodiment include one or more communication capabilities, interfaces, and features such as instances of Bluetooth™ 1070, a 3G modem 1075, a global positioning system (GPS) 1080, and an 802.11 Wi-Fi 1085.

In operation, the example of FIG. 10 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe™ Flash™ Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 11:
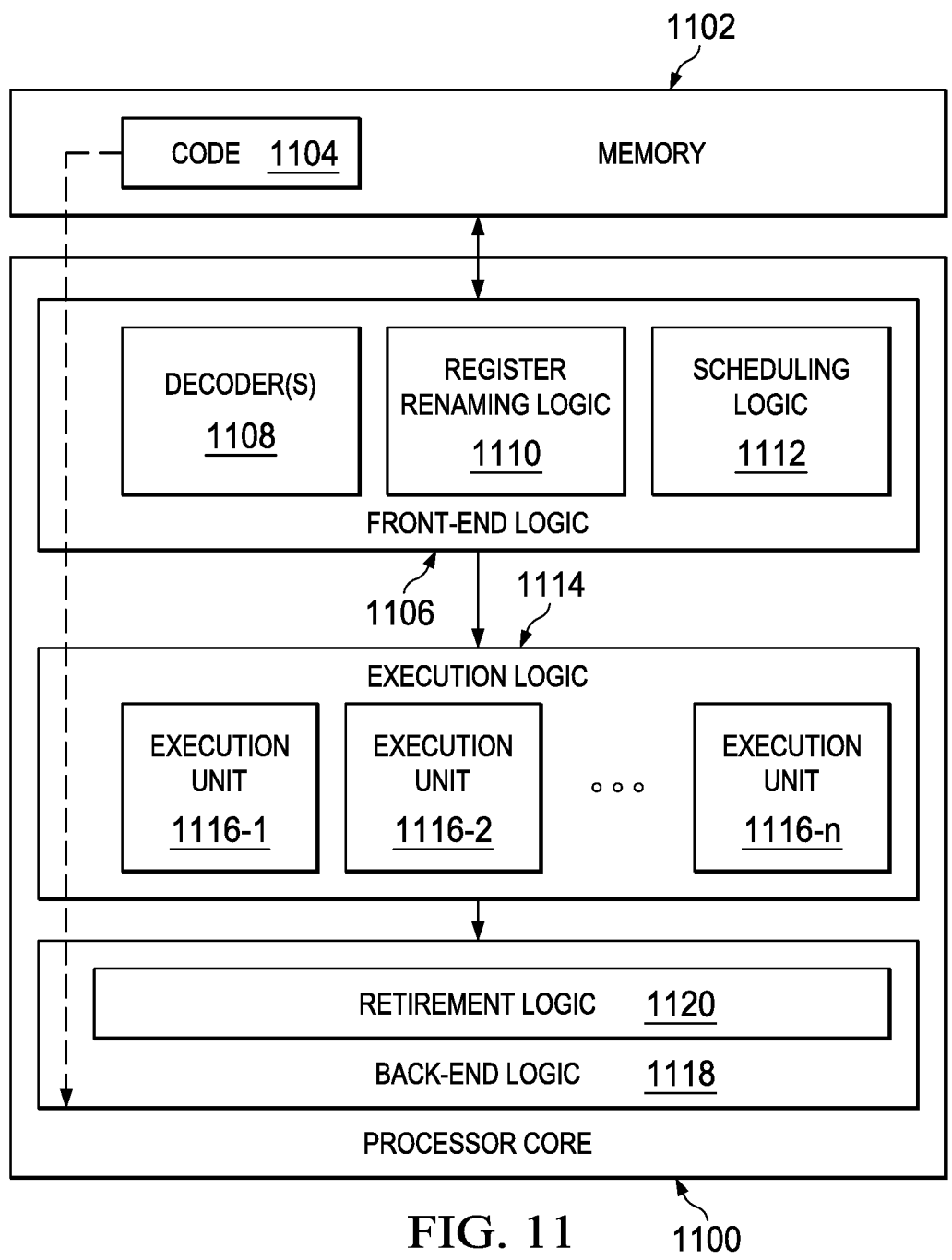
FIG. 11 is a block diagram illustrating an example processor core in accordance with an embodiment.

Turning to FIG. 11, FIG. 11 illustrates a processor core 1100 according to an embodiment. Processor core 1100 may be the core for any type of processor, such as a microprocessor, an embedded processor, a digital signal processor (DSP), a network processor, or other device to execute code. Although only one processor core 1100 is illustrated in FIG. 11, a processor may alternatively include more than one of the processor core 1100 illustrated in FIG. 11. For example, processor core 1100 represents one example embodiment of processors cores 974a, 974b, 984a, and 984b shown and described with reference to processors 970 and 980 of FIG. 9. Processor core 1100 may be a single-threaded core or, for at least one embodiment, processor core 1100 may be multithreaded in that it may include more than one hardware thread context (or "logical processor") per core.

FIG. 11 also illustrates a memory 1102 coupled to processor core 1100 in accordance with an embodiment. Memory 1102 may be any of a wide variety of memories (including various layers of memory hierarchy) as are known or otherwise available to those of skill in the art. Memory 1102 may include code 1104, which may be one or more instructions, to be executed by processor core 1100. Processor core 1100 can follow a program sequence of instructions indicated by code 1104. Each instruction enters a front-end logic 1106 and is processed by one or more decoders 1108. The decoder may generate, as its output, a micro operation such as a fixed width micro operation in a predefined format, or may generate other instructions, microinstructions, or control signals that reflect the original code instruction. Front-end logic 1106 also includes register renaming logic 1110 and scheduling logic 1112, which generally allocate resources and queue the operation corresponding to the instruction for execution.

Processor core 1100 can also include execution logic 1114 having a set of execution units 1116-1 through 1116-N. Some embodiments may include a number of execution units dedicated to specific functions or sets of functions. Other embodiments may include only one execution unit or one execution unit that can perform a particular function. Execution logic 1114 performs the operations specified by code instructions.

After completion of execution of the operations specified by the code instructions, back-end logic 1118 can retire the instructions of code 1104. In one embodiment, processor core 1100 allows out of order execution but requires in order retirement of instructions. Retirement logic 1120 may take a variety of known forms (e.g., re-order buffers or the like). In this manner, processor core 1100 is transformed during execution of code 1104, at least in terms of the output generated by the decoder, hardware registers and tables utilized by register renaming logic 1110, and any registers (not shown) modified by execution logic 1114.

Although not illustrated in FIG. 11, a processor may include other elements on a chip with processor core 1100, at least some of which were shown and described herein with reference to FIG. 9. For example, as shown in FIG. 9, a processor may include memory control logic along with processor core 1100. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and its teachings are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the operations in the preceding flow diagrams (i.e., FIGS. 2 and 3) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 has been illustrated with reference to particular elements and operations that facilitate the communication process, these elements and operations may be replaced by any suitable architecture, protocols, and/or processes that achieve the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example C1 is at least one machine readable storage medium having one or more instructions that when executed by at least one processor, cause the at least one processor to receive, from an electronic device, a request to access a network service, in response to the request, send data related to the network service to the electronic device and add at least one test link to the data related to the network service, determine if the test link was successfully routed, and classify the electronic device as untrusted if the test link was not successfully routed.

In Example C2, the subject matter of Example C1 can optionally include where wherein the request to access the network service is received by a reverse proxy module.

In Example C3, the subject matter of any one of Examples C1-C2 can optionally include where credentials to access the requested network service are obtained from an identity provider.

In Example C4, the subject matter of any one of Examples C1-C3 can optionally include where the instructions, when executed by the by at least one processor, further cause the at least one processor to communicate instructions to the electronic device as to how the electronic device could be classified as trusted.

In Example C5, the subject matter of any one of Examples C1-C4 can optionally include where the instructions, when executed by the by at least one processor, further cause the at least one processor to classify the electronic device as trusted if the test link was successfully routed.

In Example C6, the subject matter of any one of Example C1-05 can optionally include where the instructions, when executed by the by at least one processor, further cause the at least one processor to block access to the network service if the electronic device is classified as untrusted.

In Example C7, the subject matter of any one of Examples C1-C6 can optionally include where the test link is not readily identifiable a user of the electronic device.

In Example C8, the subject matter of any one of Examples C1-C7 can optionally include where the electronic device is an unmanaged device.

In Example A1, an apparatus can include a network services platform, where the network services platform is configured to receive, from an electronic device, a request to access a network service, in response to the request, send data related to the network service to the electronic device and add at least one test link to the data related to the network service, determine if the test link was successfully routed, and classify the electronic device as untrusted if the test link was not successfully routed.

In Example, A2, the subject matter of Example A1 can optionally include where the request to access the network service is received by a reverse proxy module.

In Example A3, the subject matter of any one of Examples A1-A2 can optionally include where credentials to access the requested network service are obtained from an identity provider.

In Example A4, the subject matter of any one of Examples A1-A3 can optionally include where the network services platform is further configured to communicate instructions to the electronic device as to how the electronic device could be classified as trusted.

In Example A5, the subject matter of any one of Examples A1-A4 can optionally include where the network services platform is further configured to classify the electronic device as trusted if the test link was successfully routed.

In Example A6, the subject matter of any one of Examples A1-A5 can optionally include where the network services platform is further configured to block access to the network service if the electronic device is classified as untrusted.

In Example A7, the subject matter of any one of Examples A1-A6 can optionally include where the test link is not readily identifiable by a user of the electronic device.

In Example A8, the subject matter of any one of Examples A1-A7 can optionally include where the electronic device is an unmanaged device.

Example M1 is a method including receiving, from an electronic device, a request to access a network service, in response to the request, send data related to the network service to the electronic device and add at least one test link to the data related to the network service, determining if the test link was successfully routed, and classifying the electronic device as untrusted if the test link was not successfully routed.

In Example M2, the subject matter of Example M1 can optionally include where the request to access the network service is received by a reverse proxy module.

In Example M3, the subject matter of any one of the Examples M1-M2 can optionally further include where credentials to access the requested network service are obtained from an identity provider.

In Example M4, the subject matter of any one of the Examples M1-M3 can optionally further include communicating instructions to the electronic device as to how the device could be classified as trusted.

In Example M5, the subject matter of any one of the Examples M1-M4 can optionally further include classifying the device as trusted if the test link was successfully routed.

In Example M6, the subject matter of any one of the Examples M1-M5 can optionally include blocking access to the network service if the electronic device is classified as untrusted.

In Example M7, the subject matter of any one of the Examples M1-M6 can optionally include where the test link is not readily identifiable by a user of the electronic device.

Example S1 is a system for providing a security service for an unmanaged device, the system including network services platform configured for receiving, from an electronic device, a request to access a network service, in response to the request, send data related to the network service to the electronic device and add at least one test link to the data related to the network service, determining if the test link was successfully routed, and classifying the electronic device as untrusted if the test link was not successfully routed.

In Example S2, the subject matter of Example S1 can optionally include where credentials to access the requested network service are obtained from an identity provider.

In Example S3, the subject matter of any one of the Examples S1-S2 can optionally include where the network services platform is further configured to block access to the network service if the electronic device is classified as untrusted.

In Example S4, the subject matter of any one of the Examples S1-S3 can optionally include where the network services platform is further configured to communicate instruction data to the electronic device, where the instruction data includes instructions for a user to configure the electronic device to be classified as trusted if the electronic device is classified as untrusted.

In Example S5, the subject matter of any one of the Examples S1-S4 can optionally include where the network services platform is further configured to classify the electronic device as trusted if the page redirect was successfully executed.

In Example S6, the subject matter of any one of the Examples S1-S5 can optionally include where the request to access the network service is received by a reverse proxy module.

In Example S7, the subject matter of any one of the Examples S1-S6 can optionally include where a link and credentials to access the requested network service are obtained from an identity provider.

In Example S8, the subject matter of any one of the Examples S1-S7 can optionally include where the untrusted classification of the electronic devices is stored on the electronic device.

Example X1 is a machine-readable storage medium including machine-readable instructions to implement a method or realize an apparatus as in any one of the Examples A1-A7, or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. A non-transitory machine readable medium comprising one or more instructions that when executed by a processor, cause the processor to:
   receive, by a network security platform from an electronic device, a request to access a network service;
   send, by the network security platform to the electronic device in response to the request, data related to the network service that includes embedded code that causes the electronic device to execute a new request routed through a pre-defined network element in the network security platform;
   receive, by the network security platform from the electronic device, the new request;
   determine, by the network security platform, whether the new request was routed through the pre-defined network element in the network security platform, wherein the network security platform enforces a security policy; and
   allow access to the network service based on a determination that the new request was routed through the pre-defined network element in the network security platform, wherein access to the network service is routed through the pre-defined network element; or
   block access to the network service based on a determination that the new request was not routed through the pre-defined network element in the network security platform.

2. The non-transitory machine readable medium of claim 1, wherein the request to access the network service is received by a reverse proxy module in the network security platform.

3. The non-transitory machine readable medium of claim 1, further comprising one or more instructions that when executed by the processor, further cause the processor to:
   classify the electronic device as trusted based on the determination that the new request was routed through the pre-defined network element in the network security platform.

4. The non-transitory machine readable medium of claim 1, further comprising one or more instructions that when executed by the processor, further cause the processor to:
   classify the electronic device as untrusted based on the determination that the new request was not routed through the pre-defined network element in the network security platform.

5. The non-transitory machine readable medium of claim 1, further comprising one or more instructions that when executed by the processor, further cause the processor to:
   communicate instructions to the electronic device as to how the electronic device could be allowed access to the network service.

6. The non-transitory machine readable medium of claim 1, wherein the electronic device is an unmanaged device.

7. An apparatus comprising:
   a network services platform including one or more hardware processors configured to: receive,
   by a network security platform from an electronic device, a request to access a network service;
   send, by the network security platform to the electronic device in response to the request, data related to the network service that includes embedded code that causes the electronic device to execute a new request routed through a pre-defined network element in the network security platform;

receive, by the network security platform from the electronic device, the new request;

determine, by the network security platform, whether the new request was routed through the pre-defined network element in the network security platform, wherein the network security platform enforces a security policy; and allow access to the network service based on a determination that the new request was routed through the pre-defined network element in the network security platform, wherein access to the network service is routed though the pre-defined network element; or block access to the network service based on a determination that the new request was not routed through the pre-defined network element in the network security platform.

8. The apparatus of claim 7, wherein the request to access the network service is received by a reverse proxy module in the network security platform.

9. The apparatus of claim 7, wherein the one or more hardware processors of the network services platform is further configured to:

classify the electronic device as trusted based on the determination that the new request was routed through the pre-defined network element in the network security platform.

10. The apparatus of claim 7, wherein the one or more hardware processors of the network services platform is further configured to:

classify the electronic device as untrusted based on the determination that the new request was not routed through the pre-defined network element in the network security platform.

11. The apparatus of claim 7, wherein the one or more hardware processors of the network services platform is further configured to:

communicate instructions to the electronic device as to how the electronic device could be allowed access to the network service.

12. The apparatus of claim 7, wherein credentials to access the requested network service are obtained from an identity provider.

13. The apparatus of claim 7, wherein the embedded code is not readily identifiable by a user of the electronic device.

14. The apparatus of claim 7, wherein the electronic device is an unmanaged device.

15. A method comprising:

receiving, by a network security platform from an electronic device, a request to access a network service;

sending, by the network security platform to the electronic device in response to the request, data related to the network service that includes embedded code that causes the electronic device to execute a new request routed through a pre-defined network element in the network security platform;

receiving, by the network security platform from the electronic device, the new request;

determining, by the network security platform, whether the new request was routed through the pre-defined network element in the network security platform, wherein the network security platform enforces a security policy; and allowing access to the network service based on a determination that the new request was routed through the pre-defined network element in the network security platform, wherein access to the network service is routed though the pre-defined network element; or blocking access to the network service based on a determination that the new request was not routed through the pre-defined network element in the network security platform.

16. The method of claim 15, wherein the request to access the network service is received by a reverse proxy module in the network security platform.

17. The method of claim 15, further comprising:

classifying the electronic device as trusted based on the determination that the new request was routed through the pre-defined network element in the network security platform.

18. The method of claim 15, further comprising:

classifying the electronic device as untrusted based on the determination that the new request was not routed through the pre-defined network element in the network security platform.

19. The method of claim 18, further comprising: communicating instructions to the electronic device as to how the electronic device could be allowed access to the network service.

20. The method of claim 17, wherein the embedded code is not readily identifiable by a user of the electronic device.

* * * * *